United States Patent
Giaretta et al.

(10) Patent No.: US 9,977,189 B2
(45) Date of Patent: May 22, 2018

(54) OPTICAL ELEMENT CLEAVER AND SPLICER APPARATUS AND METHODS

(71) Applicant: Thorlabs, Inc., Newton, NJ (US)

(72) Inventors: Giorgio Giaretta, Scotch Plains, NJ (US); Timothy J. Howell, Devon (GB); Michael E. Harju, Dorr, MI (US); Ying Qin, Holmdel, NJ (US)

(73) Assignee: THORLABS, INC., Newton, NJ (US)

( * ) Notice: Subject to any disclaimer, the term of this patent is extended or adjusted under 35 U.S.C. 154(b) by 168 days.

(21) Appl. No.: 15/178,082

(22) Filed: Jun. 9, 2016

(65) Prior Publication Data

US 2016/0327744 A1    Nov. 10, 2016

Related U.S. Application Data

(62) Division of application No. 13/766,243, filed on Feb. 13, 2013, now Pat. No. 9,377,583.

(Continued)

(51) Int. Cl.
*G02B 6/25* (2006.01)
*G02B 6/02* (2006.01)
(Continued)

(52) U.S. Cl.
CPC .......... *G02B 6/25* (2013.01); *G02B 6/02076* (2013.01); *G02B 6/2553* (2013.01);
(Continued)

(58) Field of Classification Search
CPC ...... G02B 6/25; G02B 6/2553; G02B 6/2555; G02B 6/02076; G06T 7/008; G06T 7/12; G06T 7/0008
See application file for complete search history.

(56) References Cited

U.S. PATENT DOCUMENTS 4,415,978 A    11/1983   Craemer et al.
4,971,418 A    11/1990   Dorsey et al.
(Continued)

OTHER PUBLICATIONS

International Search Report with Written Opinion, dated May 6, 2013, for corresponding international application PCT/US/2013/25904.

(Continued)

*Primary Examiner* — Akm Enayet Ullah
(74) *Attorney, Agent, or Firm* — Graham Curtin, P.A.

(57) ABSTRACT

Apparatus and methods are described herein for cleaving an optical element at a defined distance from a splice (or other reference point/feature) of the optical element within a desired precision and/or accuracy. In some embodiments, a method includes receiving an indication of a location of a feature in an intermediate optical assembly visible within an image of the intermediate optical assembly. The feature can be for example, a splice. A position of the intermediate optical assembly is translated relative to a cleave unit based on the indication. After translating, the intermediate optical assembly, the intermediate optical assembly is cleaved to form an optical assembly that has an end face at a location disposed at a non-zero distance from the location of the feature. In some embodiments, the location of the feature can be determined with an image recognition system.

5 Claims, 14 Drawing Sheets

Related U.S. Application Data

(60) Provisional application No. 61/598,571, filed on Feb. 14, 2012.

(51) Int. Cl.
   G02B 6/255 (2006.01)
   G06T 7/00 (2017.01)
   G06T 7/12 (2017.01)

(52) U.S. Cl.
   CPC .......... G02B 6/2555 (2013.01); G06T 7/0008 (2013.01); G06T 7/12 (2017.01)

(56) References Cited

U.S. PATENT DOCUMENTS

| | | | |
|---|---|---|---|
| 5,501,385 A * | 3/1996 | Halpin | G02B 6/25 225/96 |
| 5,748,804 A | 5/1998 | Surka | |
| 5,926,594 A | 7/1999 | Song et al. | |
| 6,456,685 B1 | 9/2002 | Lagasse | |
| 6,570,688 B2 | 5/2003 | Lagasse | |
| 7,131,771 B2 * | 11/2006 | Huang | G02B 6/2551 385/95 |
| 7,255,498 B2 * | 8/2007 | Bush | G01M 11/37 385/95 |
| 7,377,700 B2 | 5/2008 | Manning et al. | |
| 7,403,686 B1 | 7/2008 | Zervas | |
| 2001/0020375 A1 | 9/2001 | Novack et al. | |
| 2002/0064341 A1 * | 5/2002 | Fauver | G02B 6/241 385/25 |
| 2002/0064355 A1 | 5/2002 | Ware et al. | |
| 2002/0109831 A1 * | 8/2002 | Van Nguyen | B08B 1/00 356/73.1 |
| 2008/0308727 A1 * | 12/2008 | Boguslaysky | G01N 1/286 250/307 |
| 2008/0310812 A1 | 12/2008 | Watte et al. | |
| 2010/0183273 A1 | 7/2010 | Heidler et al. | |
| 2011/0017380 A1 | 1/2011 | Engelbart | |

OTHER PUBLICATIONS

Non-Final Office Action dated Jul. 8, 2015 for corresponding U.S. Appl. No. 13/766,243.

* cited by examiner

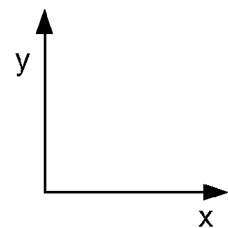

Splice

Translate

Cleave

Verify

Align

Splice

Translate

Cleave

Verify

OPTICAL ELEMENT CLEAVER AND SPLICER APPARATUS AND METHODS

CROSS-REFERENCE TO RELATED APPLICATIONS

This application is a divisional of U.S. patent application Ser. No. 13/766,243 filed Feb. 13, 2013, which claims priority to U.S. Provisional Application No. 61/598,571 filed Feb. 14, 2012. The contents of each of the U.S. patent application Ser. No. 13/766,243 and U.S. Provisional Application No. 61/598,571 are hereby incorporated by reference.

BACKGROUND

Some embodiments described herein relate generally to methods and apparatus to cleave an optical element at a defined distance from a splice within a desired precision and/or accuracy.

Many known optical assemblies include an optical fiber joined or connected to other optical elements. The optical fiber can be any type of optical fiber including, but not limited to, for example, a single mode optical fiber, a multimode optical fiber, a "coreless" optical fiber, which has a substantially homogenous refractive index, a tapered optical fiber, or an optical fiber with a mode expansion or contraction region. The optical elements can be a variety of different types, such as, for example, any of the optical fibers listed above, a GRIN (Gradient Index) lens, a conventional lens, or a rod of glass or other material with or without an internal waveguide structure. If the optical element is an optical fiber it may have the same or different properties than the optical fiber to which it is joined. Other types of optical elements can be joined to the optical fiber.

One known example method of joining or connecting an optical fiber and an optical element includes a fusion splice. In this method, the abutting end faces of the optical fiber and the optical element to be joined are heated so that their respective end face surfaces soften, and fuse together, forming a splice. The splice can be mechanically robust, which can provide for permanent attachment, require no attachment hardware, and provide a low loss optical coupling between the optical fiber and optical element.

Some known techniques for cleaving and/or splicing an optical fiber can include certain limitations. For example, some known systems may require an operator to identify the location of a fiber splice or other reference point, and manually position a cleave blade. Such a manual process can be slow, inaccurate, and irreproducible. Some known systems do not combine a cleaver and splicer into the same apparatus. Such systems may require manual transfer of the optical element between the cleaver and the splicer using, for example, clips or inserts, which can result in a loss of the reference alignment. Such systems may not provide accurate positioning between features, such as, for example, between cleaves and splices, along the longitudinal axis of the optical element.

Thus, a need exists for an apparatus capable of fabricating faster, more accurate, and/or more reproducible optical assemblies having a cleave positioned at a defined distance from a splice or some other feature in the optical assembly.

SUMMARY

Apparatus and methods are described herein for cleaving an optical element at a defined distance from a splice (or other reference point/feature) of the optical element within a desired precision and/or accuracy. In some embodiments, a method includes receiving an indication of a location of a feature in an intermediate optical assembly visible within an image of the intermediate optical assembly. The feature can be, for example, a splice. A position of the intermediate optical assembly is translated relative to a cleave unit based on the indication. After translating, the intermediate optical assembly is cleaved to form an optical assembly that has an end face at a location disposed at a non-zero distance from the location of the feature. In some embodiments, the location of the feature can be determined with an image recognition system.

DETAILED DESCRIPTION

Figure 1:
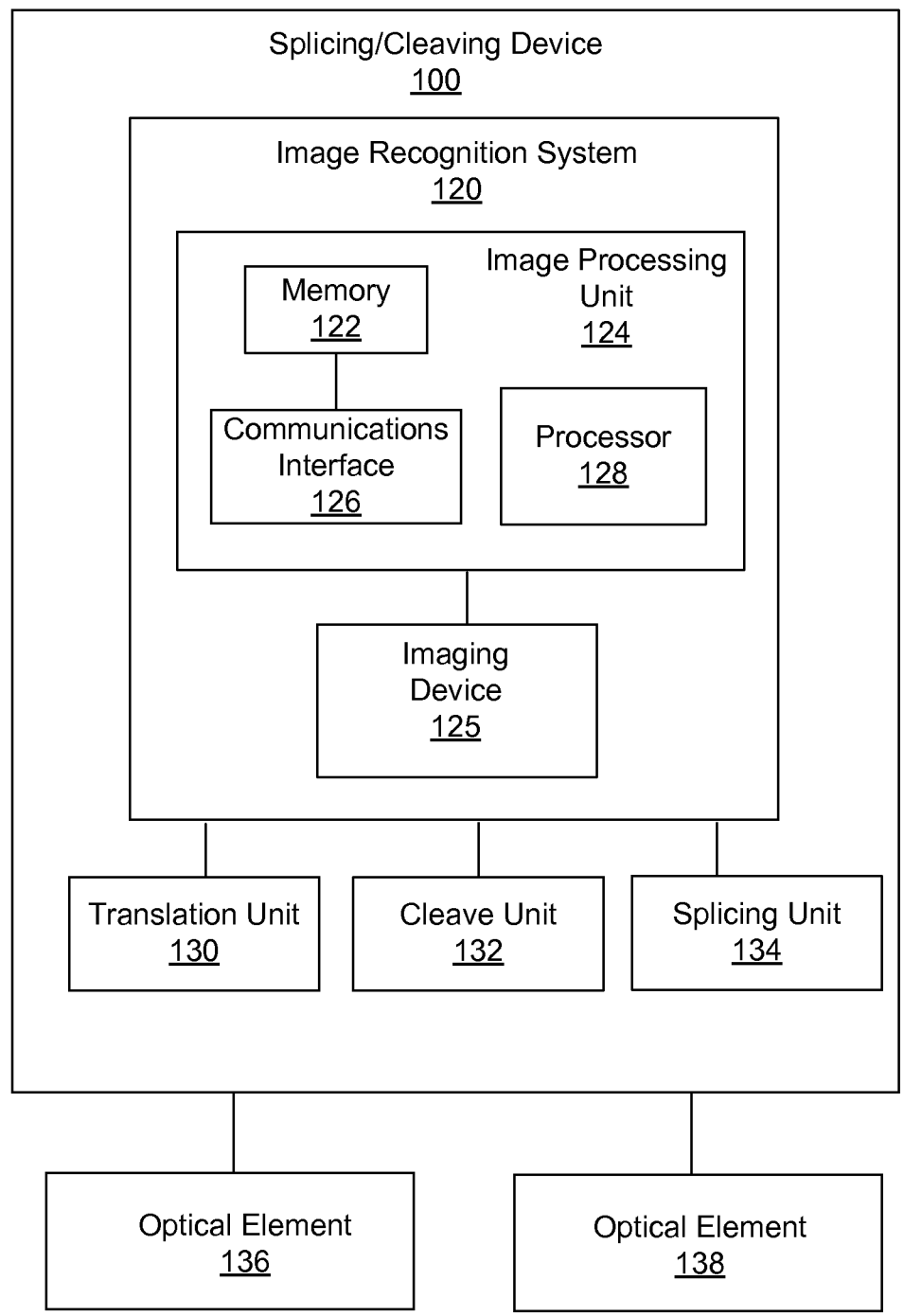
FIG. 1 is a schematic illustration of a slicing/cleaving apparatus, according to an embodiment.

Apparatus and methods are described herein for cleaving an optical element (e.g., an optical fiber) at a defined distance from a splice (or other reference point/feature) of the optical fiber within a desired precision and/or accuracy by using image recognition and digital signal processing techniques. In some embodiments, an apparatus and method are provided to splice an optical element to another optical element at a defined distance from a splice or other reference point or feature visible within an image of at least one of the optical elements, within a desired precision and/or accuracy by using image recognition and digital signal processing techniques. An optical element can be, for example, a fiber, a glass rod, a gradient-index (GRIN) lens, or other type of optical element.

In some embodiments, an apparatus and method are provided to splice or cleave an optical element at a defined location within a desired precision and/or accuracy and that can be achieved in an automated fashion such that the entire splicing or cleaving operation can be controlled without manual user intervention. In some embodiments, a cleaver/splicer apparatus can provide placement of a cleave and/or splice relative to a feature identified by image recognition within a defined desired precision and/or accuracy. The feature can be, for example, a splice, a cleave, a Bragg grating, or any type of reference mark visible in an image. In some embodiments, a segmented optical assembly is provided that includes multiple optical elements each having a defined length, and the multiple optical elements can be sequentially spliced together along a longitudinal direction.

In some embodiments, a cleaver and splicer apparatus and method to cleave a fiber at a defined distance within a desired precision and/or accuracy from a splice (or other reference point/feature) can include use of image recognition and digital signal processing techniques. In some embodiments, a cleaver and splicer apparatus and method can be used to manufacture optical assemblies for use in, for example, medical applications, such as, for example, endoscopes.

In some embodiments, a cleaver and splicer apparatus can automatically cleave and/or splice an optical element without user intervention. In some embodiments, a cleaver apparatus can cleave a fiber at a defined distance from a splice (or other reference point/feature) within a desired precision and/or accuracy by using image recognition and digital signal processing techniques.

Advantages of one or more embodiments of a cleaver/splicer apparatus can include, for example, a reproducible end face position relative to splice position. For example, using the methods described herein, GRIN lenses having a length defined to a desired precision and/or accuracy can be spliced to an end of a fiber to collimate and expand free space optical beams. Having an expanded and collimated free space beam may relax the tolerance of fiber-to-fiber coupling through connectors. Having an expanded and collimated free space beam may in addition, or alternatively, allow focusing of the light emitted from the fiber by subsequent optical elements. Having an expanded and collimated free space beam may also facilitate coupling of the optical energy emitted by a laser or light emitting diode (LED) light into a fiber.

Another potential advantage of the devices and methods described herein can include the capability of forming segmented optical assemblies composed of different optical elements, each having an accurate and/or precise and/or controlled length, spliced together in a sequence to form optical cavities, periodic structures, gratings or achieve beam shaping. In some embodiments, reduced manufacturing time can also be achieved, as well as the ability to accurately place an end face relative to a reference point, such as, for example, a fiber splice.

FIG. 1 is a schematic illustration of a splice and cleave device, according to an embodiment. A splice and cleave device 100 can include an optical image recognition system 120 (also referred to as image recognition system), one or more translation units 130, a cleave unit 132 and a splicing unit 134. The image recognition system 120 can include an image processing unit 124, which includes a processor 128, an imaging device 125 and a memory 122; and a communications interface 126. The imaging device 125 can include imaging optics and image sensors (not shown in FIG. 1), such as, for example, a charge-coupled device (CCD) or similar sensor with hardware and/or software (e.g., a second processor and a second memory, each not shown in FIG. 1) to capture and analyze the intensity of each pixel in the sensing array. For example, the hardware and/or software associated with an image sensor can relate to sampling (e.g., receiving an output) and/or modifying signals output from the sensor, for example, post sampling processing, equalization, etc. The imaging device 125 can have magnification that enables individual pixel sizes in the range of, for example, 0.2 to 1.0 micron, or other suitable pixel sizes.

The image processing unit 124 can receive from the imaging device 125 an image(s) of one or more optical elements coupled to the splice and cleave device 100. For example, as shown in FIG. 1, a first optical element 136 and a second optical element 138 can each be coupled to a translation unit 130 of the splice and cleave device 100 using, for example, a clamp device (not shown). Each of the optical elements 136 and 138 can be, for example, a single mode optical fiber, a multimode optical fiber, a "coreless" optical fiber, which has a substantially homogenous refractive index, a tapered optical fiber, an optical fiber with a mode expansion or contraction region, a GRIN (Gradient Index) lens, a conventional lens, or a rod of glass or other material with or without an internal waveguide structure.

The image recognition system 120 can include a combination of hardware modules and/or software modules (e.g., stored in memory and/or executing in a processor). Processor 128 can be operatively coupled to memory 122 and communications interface 126. Communications interface 126 can be one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

Memory 122 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

The processor 128 can be any of a variety of processors. Such processors can be implemented, for example, as hardware modules such as embedded microprocessors, Application-Specific Integrated Circuits ("ASICs"), Programmable Logic Devices ("PLDs") and Field-Programmable Gate Array Devices ("FPGAs"). Some such processors can have multiple instruction executing units or cores. Such processors can also be implemented as one or more software modules (e.g., stored in memory and/or executing in a processor) in programming languages such as, for example, Java™, C++, C, assembly, a hardware description language, or any other suitable programming language. A processor according to some embodiments includes media and computer code (also can be referred to as code) specially designed and constructed for the specific purpose or purposes. In some embodiments, the processor 128 can support standard HTML, and software languages such as, for example, JavaScript, JavaScript Object Notation (JSON), Asynchronous JavaScript (AJAX).

In some embodiments, the processor 128 can be, for example, a single physical processor such as a general-purpose processor, an ASIC, a PLD, or a FPGA having a single processing core or a group of processing cores. Alternatively, the processor 128 can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In yet other alternatives, the processor 128 can be a group of distributed processors (e.g., computing devices with one or more physical processors) operatively coupled one to another via a separate communications network (not shown). Thus, the processor 128 can be a group of distributed processors in communication one with another via a separate communications network (not shown). In some embodiments, a processor can be a combination of such processors. For example, a processor can be a group of distributed computing devices, where each computing device includes a group of physical processors sharing a memory bus and each physical processor includes a group of processing cores.

As described above, the splice and cleave device 100 can include one or more translation units 130 each configured to secure an optical element (e.g., optical elements 136 and 138) to the splice and cleave device 100 and to move or translate the optical element(s) within the splice and cleave device 100 as described in more detail below. The splice and cleave device 100 can be used to splice and/or cleave one or more such optical elements. For example using the splicing unit 134, a first optical element 136 can be spliced to a second optical element 138 to form an intermediate optical assembly (not shown in FIG. 1) as described in more detail below. The first optical element 136 can have the same or different properties than the second optical fiber 138 to which it is joined. The cleaving unit 132 can be used to cleave the intermediate optical assembly to form an optical assembly, as described in more detail below.

The image recognition system 120 is configured to image an intermediate optical assembly coupled to the splice and cleave device 100, and determine, using image recognition software and digital signal processing, a location of a reference feature visible within an image of at least one of the optical elements (e.g., optical elements 136 and 138). The reference feature can be, for example, a splice, a cleave, a location within a Bragg grating, a location on a stripped fiber region, a location on a tapered fiber section, or any other type of reference feature visible in an image. For example, the reference feature can be a start or end of an optical element, a start or end of a tapered fiber section, a start or end of a stripped fiber region, etc. Further details regarding the function of the image recognition system 120 are described below. After determining the location of a reference feature, the image recognition system 120 can then send a signal to the translation unit 130 to move or translate the intermediate optical assembly relative to the cleave unit 132 such that a cleave blade (not shown in FIG. 1) of the cleave unit 132 is disposed at a select distance from the reference feature. The cleave unit 132 can then cleave the intermediate optical assembly to form an optical assembly.

The process of splicing and cleaving can be automated such that user intervention (or manual interaction) is not required during the fabrication process. In some embodiments, some or all of the processes of the image recognition, splicing, cleaving, and translating operations can be controlled through digital data acquisition, digital signal analysis, and software algorithms.

Figure 2:
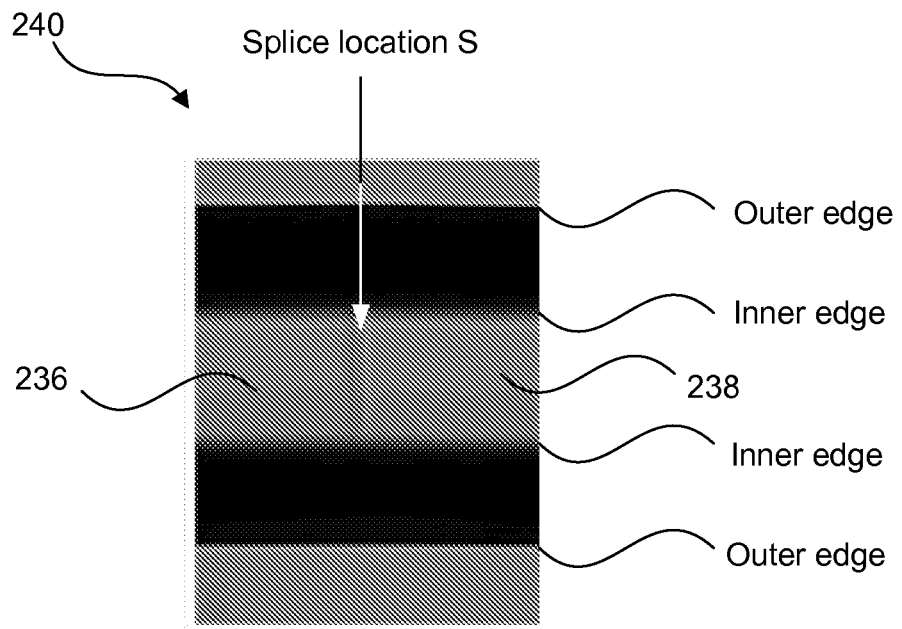
FIG. 2 is an exemplary photograph of a portion of an optical element having a fiber splice.

FIG. 2 illustrates an image of a portion of an intermediate optical assembly 240. The image is an example of an image that can be obtained using, for example, the splice and cleave device 100. The intermediate optical assembly 240 is shown stripped (e.g., the cladding has been removed) and includes an optical fiber 236 on the left hand side of FIG. 2 that is spliced at splice location S to an optical fiber 238 on the right hand side of FIG. 2. Only a portion of the optical fibers 236 and 238 are illustrated as both optical fiber 236 and optical fiber 238 can extend a length in the longitudinal x-direction. The longitudinal direction can be, for example, substantially parallel to a centerline of the optical fiber 236 and optical fiber 238. The fiber cores of optical fiber 236 and optical fiber 238 are not visible in FIG. 2.

The splice location S is visible as an interface between optical fiber 236 and optical fiber 238 and is oriented substantially parallel to the y-direction in FIG. 2. As shown in the image, outer edges and inner edges of the intermediate optical assembly 240 (e.g., optical fiber 236 and optical fiber 238) are shown at the outer periphery of the dark area of the image. The optical fiber 236 and optical fiber 238 appear to have dark and light areas due to internal variations in the refractive index and refraction of light from the outer cylindrical surface of optical fiber 236 and optical fiber 238. In this example, the outer edges of the intermediate optical assembly 240 are at an outer boundary of the optical fiber 236 and the outer boundary of the optical fiber 238. The inner edges of the intermediate optical assembly 240 are also shown in FIG. 2. The inner edges refer to the boundary of a central region of optical fiber 236 and a central region of the optical fiber 238, which appear in the image brighter than portions of optical fiber 236 and optical fiber 238 adjacent the outer boundary. The inner edges of the intermediate optical assembly mark the boundary of the region where the fiber core and/or the splice interface may be visible in the image. At regions near the outer edges, the splice location may not be visible due to low contrast in the image.

It may be desirable to have the splice location S be at a defined distance from some other feature in the intermediate optical assembly 240, such as, for example, the end face of the intermediate optical assembly 240. Some known systems may require a human operator or user to identify the location of the splice or other reference point, and manually position the cleave blade to cleave and form the assembly end face. This process can be slow, inaccurate, and irreproducible. A splice and cleave device as described herein (e.g., splice and cleave device 100) can precisely and accurately position an intermediate optical assembly relative to a cleave blade at a defined distance from a reference feature (e.g., a splice or other reference feature described above) such that the intermediate optical assembly can be cleaved to form an end face at the defined distance from the reference feature.

Figure 3A:
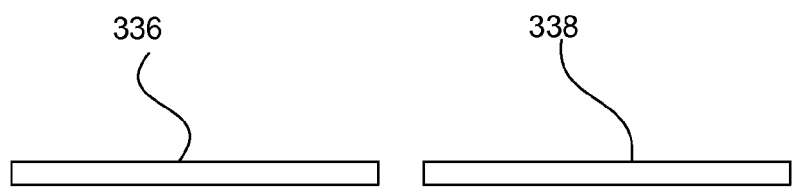
FIGS. 3A-3F are each a schematic diagram illustrating optical elements during a different step of a method of making an optical assembly with a defined and controlled distance between a reference feature and an end face of the optical assembly, according to an embodiment.
Figure 3B:
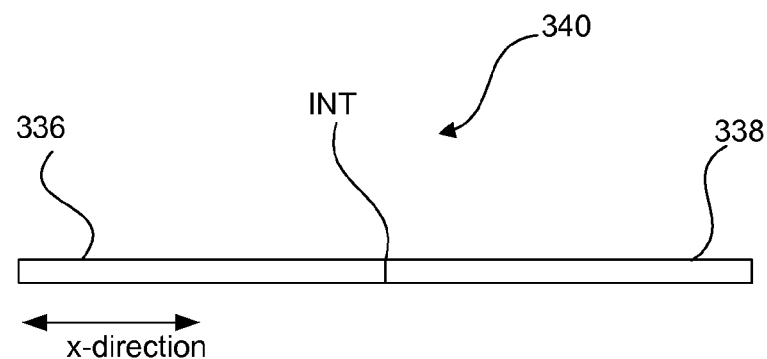

FIGS. 3A-3F illustrate optical elements during a method of fabricating an optical assembly using, for example, the splice and cleave device 100, according to an embodiment. Thus, the method of FIGS. 3A-3F is described with reference to the splice and cleave device 100 described above for FIG. 1. FIG. 3A illustrates a portion of a first optical element 336 and a portion of a second optical element 338. The optical element 336 and the optical element 338 can each be, for example, an optical fiber, such as, a single mode optical fiber, a multimode optical fiber, a "coreless" optical fiber, which has a substantially homogenous refractive index, a tapered optical fiber, or an optical fiber with a mode expansion or contraction region. The optical elements 336 and 338 can also or alternatively be or include a GRIN (Gradient Index) lens, a conventional lens, or a rod of glass or other material with or without an internal waveguide structure. The optical element 336 can be the same type or a different type as optical element 338. Both optical element 336 and optical element 338 can be elongated or extend a length along an, x-direction, as shown in FIG. 3B.

As shown in FIG. 3B, the optical element 336 and the optical element 338 can be joined to form an intermediate optical assembly 340 (see, e.g., FIG. 3C) using the splice and cleave device 100 as described above. As shown in FIG. 3B, the optical element 336 can be aligned to the optical element 338 such that an end face of the optical element 336 abuts an end face of the optical element 338. For example, the optical element 336 and the optical element 338 can each be coupled to a separate translation unit 130 and the translation units 130 can be used to move or translate one or both of the optical elements 336 and 338 to place the end faces of the optical elements 336 and 338 in the abutting position. In some embodiments, sub-micron positioning accuracy can be used to align optical element 336 and optical element 338. For example, the translation unit(s) 130 of the splice and cleave device 100 can include stepper motors having sub-micron resolution and can be used to translate optical element 336 and optical element 338 toward each other and provide a sufficient level of alignment control. In some embodiments, finer, nanometer level motion control can be obtained, for example, using motors with piezoelectric actuators.

Figure 3C:
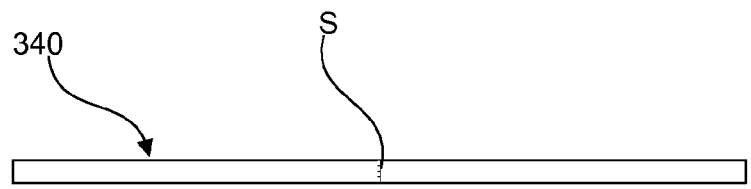

An optical image recognition system 120 can be used to facilitate the alignment of optical element 336 and optical element 338. A location of an interface INT between optical element 336 and optical element 338 can be identified and recorded by the image recognition system and digitally processed such that the alignment location can be accurately known and recorded. After being aligned, heat can be applied at the interface INT between optical element 336 and optical element 338 to splice the optical element 336 and the optical element 338 together and form the intermediate optical assembly 340, as shown in FIG. 3C. The splice S can be substantially parallel to the y-direction as shown in FIG. 3C. The location of the splice S can be substantially coincident with a position of the interface INT between optical element 336 and optical element 338 prior to forming the splice.

As described above, the image recognition system 120 can identify and determine the location of the splice S. For example, the image recognition system can directly measure the splice location using image recognition software and digital signal processing embodied within the image processing unit 124 of the image recognition system 120. Alternatively, the splice location can be inferred from the location of the interface INT between the abutting optical elements 336 and 338, which can be determined using image recognition software and digital signal processing of the image recognition system 120. For example, as described above, an imaging device 125 of the image recognition system 120 can image the optical elements 336 and 338, and the images can be used by the image recognition system 120 to identify a reference feature (e.g., splice) on the intermediate optical assembly 340.

Figure 3D:
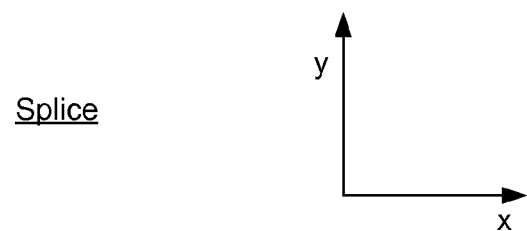
Figure 3D:
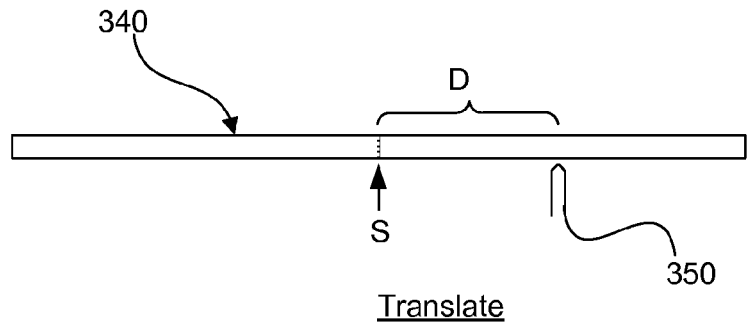

Next, the intermediate optical assembly 340 can be translated along the x-direction, as shown in FIG. 3D, using one of the translation units 130 of the splice and cleave device 100. For example, after being spliced, the intermediate optical assembly can be coupled to a single translation unit 130. The amount of translation can be determined such that a distance between a cleave blade 350 of the cleave unit 132 of the splice and cleave device 100 and the location of the splice S along the x-direction is a user defined distance, D, as shown in FIG. 3D. In other words, with the location of the splice S determined, the image recognition system 120 can send a signal to the translation unit 130 instructing the translation unit 130 to move or translate the intermediate optical assembly 340 to a desired location relative to the cleave blade 350 such that the cleave blade 350 is at a defined distance D from the location of the splice S. As described above, the accuracy and/or precision of the motors of the translation unit 130 can allow for very accurate and reproducible positioning of the intermediate optical assembly 340 relative to the cleave blade 350. In some embodiments having a stepper motor, the resolution can be, for example, approximately 0.25 microns. In alternative embodiments having a piezoelectric motor, resolution can be, for example, approximately 1 nm. In alternative embodiments, the intermediate optical assembly 340 can be fixed and the cleave blade 350 can be moved in the x-direction. In yet another alternative, both the intermediate optical assembly 340 and the cleave blade 350 can be moved in the x-direction.

Figure 3E:
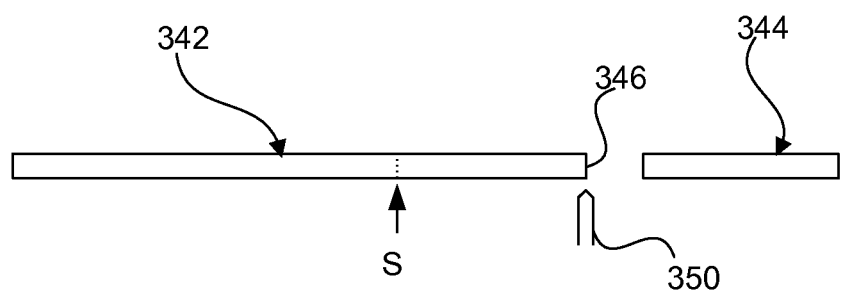
Figure 3F:
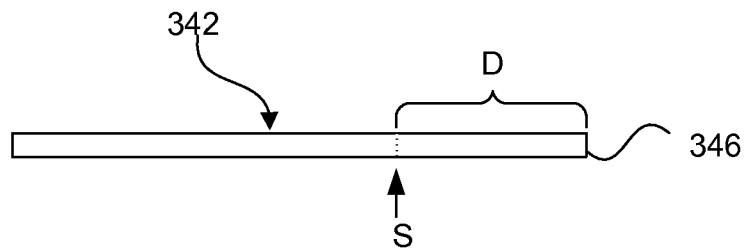

With the intermediate optical assembly 340 disposed at a desired position relative to the cleave blade 350, the cleave unit 132 can cleave the intermediate optical assembly 340 to form an optical assembly 342 and a waste element 344, as shown in FIG. 3E. The cleave blade 350 can form an end face 346 on an end of the optical assembly 342. The waste element 344 can be discarded. In some embodiments, the tolerance of the distance between the end face 346 and the location of the splice S (e.g., the distance D) can be less than 10, 5, 2, 1, 0.5, 0.2, 0.1, 0.05, 0.02, 0.01, or 0.005 microns depending on the particular embodiment. As shown in FIG. 3F, optionally, the distance D between the splice S and the end face 346 of the optical assembly 342 can be verified to determine if the distance D is within the user defined tolerance.

To identify the location of the splice S in the process above, an image recognition algorithm or process can be used to identify and define the location of the splice S and/or the location of the end face 346 of the optical assembly 342. For example, the image processing unit 124 of the image recognition system 120 can include and implement the image recognition algorithm/process. The algorithm can be a method implemented on the processor 128 of the image processing unit 124. For example, the method of the algorithm/process can be embodied as computer code stored in the memory 122 and/or executed by the processor 128 of the image processing unit 124 of the image recognition system 120.

As described above, an image of the field of view of the imaging recognition system 120 can be obtained. For example, an image such as the example image shown in FIG. 2 can be obtained. The image can be pixilated into columns that are parallel to the y-axis, and rows that are parallel to the x-axis by the image processing unit 124. The image recognition algorithm/process can be used to determine if and how many optical elements are visible in the image. The optical elements can be optical fibers or other types of optical elements, as previously described.

Image columns can be scanned in the y-direction to determine the largest rate of change in image intensity for each column. Columns with a high maximum rate of change can indicate the presence of an optical element. Columns with a very low maximum rate of change can indicate that no optical element is present. From this analysis, an inference can be made as to whether the image contains, for example, a continuous optical element, a single left optical element, a single right optical element, or two, individual, un-spliced optical elements as described below.

A single left optical element can mean a single optical element in the field of view, which has an end face in the field of view and extends outward from the left side of the field of view. Similarly, a single right optical element can mean a single optical element in the field of view, which has an end face in the field of view and extends outward from the right side of the field of view. A continuous optical element refers to an optical element that extends across the field of view. For example, in FIG. 2, a continuous fiber optical element that includes an optical fiber 236 and an optical fiber 238 spliced together is visible extending across the field of view.

The image recognition algorithm/process can then identify a feature or features within or at the boundaries of the optical element(s) located by the algorithm/process, as described above. Specifically, a multi-resolution image processing technique can be used to determine the outer and inner optical element edges in the regions determined by the algorithm/process. For example, as described above with reference to FIG. 2, the outer edges can refer to the outer boundary of an optical element and the inner edges can refer to the boundary of a central region of the optical element, which is brighter than portions of the optical element adjacent the outer boundary. The inner edges can mark the boundary of the region where the fiber core and/or the splice interface (or other reference feature) may be visible. Regions near the outer edges of the splice location may not be visible due to low contrast in the image. The image may be scanned in the x-direction within the bounds of the inner edges to determine the column locations at which the most significant rate of change data occurs. Results of these scans can be tabulated. Regions corresponding to high rates of change in the image intensity correspond to feature(s) within or at the boundaries of any optical elements in the image.

Next, the algorithm/process can perform a more detailed analysis over the high rate of change areas identified by the algorithm as described above. The detailed analysis can be based on the following premises. When a splice image is made up of a number of strong lines substantially parallel to the y-axis, the actual splice location occurs at the point of lowest intensity where the rate of change in intensity is zero, i.e., a minimum in the intensity. When the splice image is made up of a single visible core on one side of the splice or when detecting the cleave face, the splice or optical element end face is located where the rate of change in intensity is at its maximum.

After the location of the splice or the end face location has been determined, the distance between splice-to-splice interfaces and/or end faces can be determined using the known image resolution and/or the known amount of translation. The algorithm/process may allow measurement accuracy smaller than the pixel size because of the nature of the signal processing.

Figure 4:
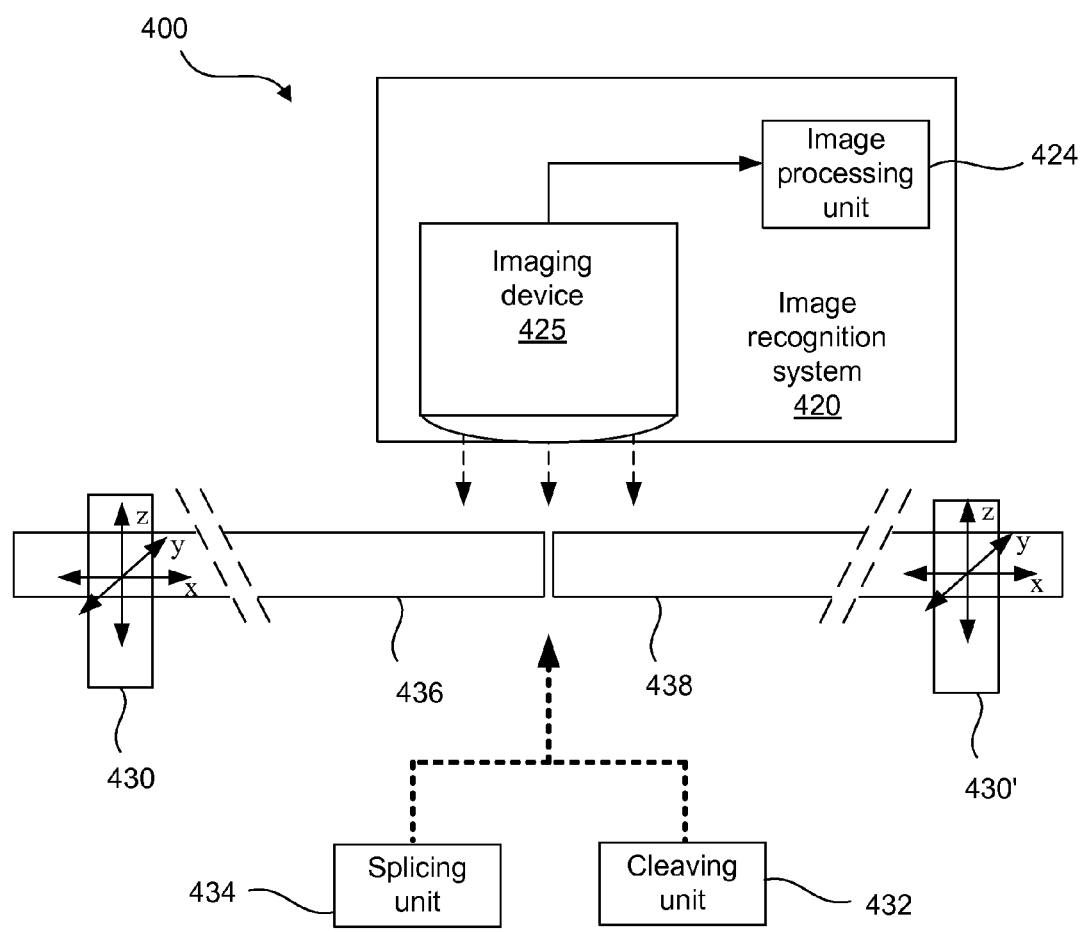
FIG. 4 is a schematic diagram of a splice and cleave apparatus, according to an embodiment.

FIG. 4 is a schematic diagram of another embodiment of a splice and cleave device that can be used to perform the above described splice and cleave processes. A splice and cleave device 400 includes an image recognition system 420, a translation unit 430, a translation unit 430', a splicing unit 434, and a cleave unit 432. The image recognition system 420 can include an imaging device 425 that can include imaging optics and sensor element(s). The image pixel size on the sensor element can be, for example, approximately 0.625 microns by 0.625 microns. The image recognition system 420 also includes an image processing unit 424. The image processing unit 424 can be, for example, a computer having a processor and a memory (also referred to herein as a computer-readable medium) that can store code, such as code to perform the previously described image recognition algorithm/process. The image processing unit 424 can include, for example, a communications interface that can be one or more wired and/or wireless data connections as described above with reference to FIG. 1. The image processing unit 424 can locate the location of a reference feature(s) (e.g., a splice) and the location of an end face of an optical element, as previously described.

In operation, abutting ends of optical element 436 and optical element 438 are positioned in the field of view of the imaging device 425 (e.g., in view of the imaging optics) of the image recognition system 420. Optical element 436 and optical element 438 can be independently positioned using the translation unit 430 and the translation unit 430', respectively. The optical element 436 and the optical element 438 can each be secured to translation unit 430 and translation unit 430', respectively, using a removable clamp (not shown in FIG. 4). Translation unit 430 and translation unit 430' can each be capable of moving in three orthogonal directions, denoted by the x-axis, y-axis, and z-axis in FIG. 4.

In operation, the splicing unit 434 can be positioned around (e.g., encircling or partially encircling) the abutting ends or end portions of optical element 436 and optical element 438. The splicing unit 434 can be used to form a splice at the interface between the optical element 436 and the optical element 438 by applying heat from the splicing unit 434 to the interface and the surrounding region. After the splicing operation, the splicing unit 434 can be removed and the cleave unit 432 can be positioned in the same or substantially the same location as the splicing unit 434 was previously located. Alternatively, the splicing unit 434 and the cleave unit 432 can be positioned at different locations relative to the location of the abutting ends of optical element 436 and optical element 438 in the x-direction.

An intermediate optical assembly (not shown) formed by splicing together optical element 436 and optical element 438 can be translated in the x-direction using translation unit 430, translation unit 430', or both. Optionally, a clamp from one of the translation units 430 or 430' can be released such that the intermediate optical assembly can be translated with a single translation unit. The amount of translation can be selected such that a distance between a cleave blade (not shown) of the cleave unit 432 and the splice location can be controlled by a user or automatically to a user-defined distance. For example, the distance can be controlled to submicron accuracy. As described above, for example, the translation units 430 and 430' can include stepper and/or piezoelectric motors having sub-micron or nanometer resolution can be used to translate the intermediate optical assembly. The accuracy and/or precision of the motors can allow for very accurate and reproducible positioning of the splice location on the intermediate optical assembly (e.g., the combination of optical element 436 spliced to optical element 438) relative to the cleave blade. The cleave unit 432 can cleave the intermediate optical assembly to form an optical assembly. The cleave unit 432 can cleave the intermediate optical assembly such that the distance between the splice and an end face of the intermediate optical assembly can be controlled within a defined precision and/or accuracy. As described previously, the process of splicing and cleaving can be automated such that human user intervention is not required during the fabrication process. In some embodiments, some or all of the processes of the image recognition, splicing, cleaving, and translating operations can be controlled through digital data acquisition, digital signal analysis, and software algorithms.

Figure 5:
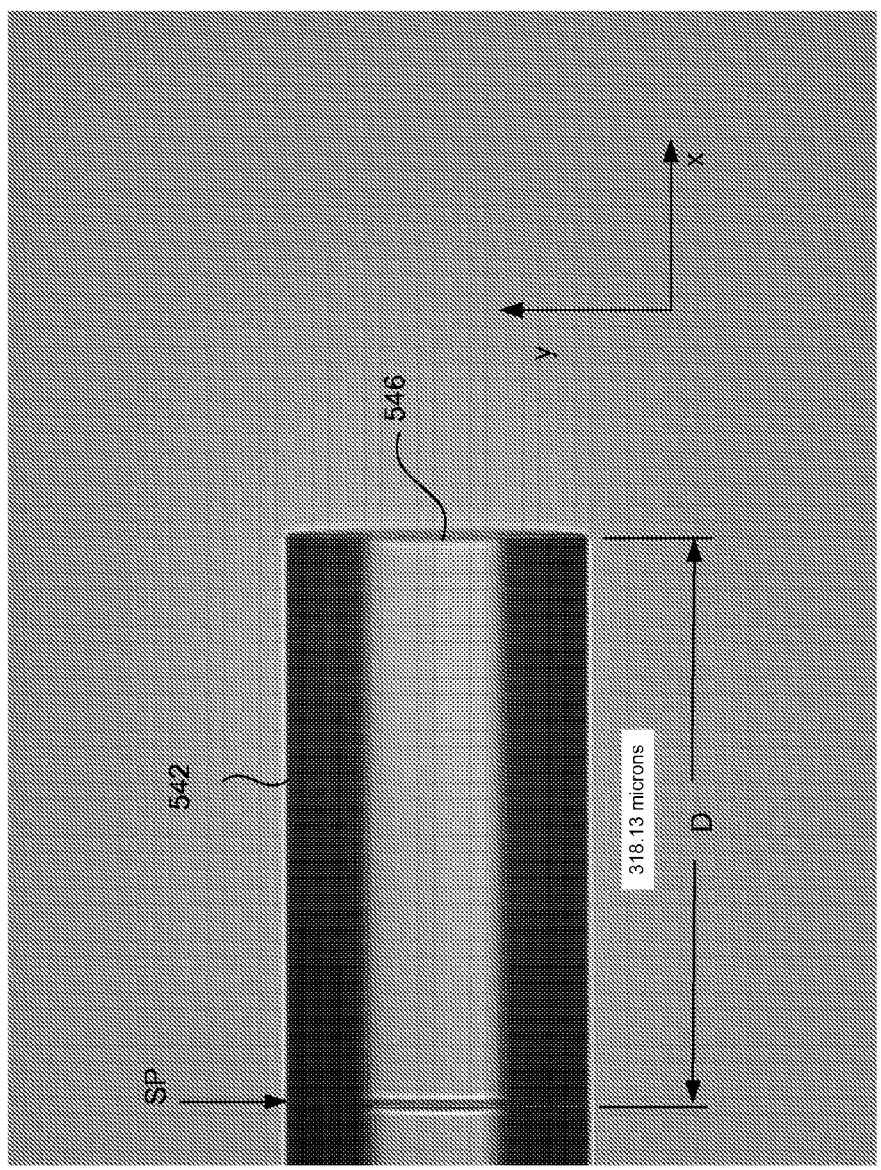
FIG. 5 is an exemplary photograph of an optical assembly showing a splice location and end face.

FIG. 5 is a photograph showing a portion of an optical assembly 542 with the cladding removed. The image is another example of an image that can be obtained using, for example, the splice and cleave device 100 or 400. As shown in FIG. 5, the location of a splice SP is evident as the discontinuity in the image oriented substantially parallel to the y-axis near the left side of the image. An end face 546 of the optical assembly 542 is located centrally in the image and is also oriented substantially parallel to the y-axis. In this example image, the distance D between the splice SP and the end face 546 has been accurately controlled to 318.13 microns. Measurement to this level of accuracy can be enabled by the previously described image recognition algorithm/process. Although the appearance of the splice shown in FIG. 5 is different than the appearance of the splice shown in FIG. 1, the image recognition algorithm/process previously described can accurately identify the location of the splice in either case.

Further processing can optionally be performed on an optical assembly formed or fabricated by the above described splicing and cleaving processes. For example, in some embodiments, the end face of the optical assembly can be heated to curve the end face, which can form a lens. The heating process can be performed, for example, using a splicing unit as described above. In addition to or alternatively, other optical elements may be joined to an optical assembly end face to form a segmented optical assembly. FIGS. 6A-6F illustrate optical elements during a method of forming such a segmented optical assembly.

Figure 6A:
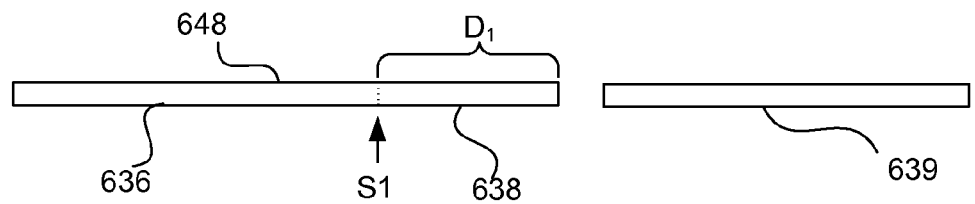
FIGS. 6A-6F are each a schematic diagram illustrating optical elements during a different step of a method of making a segmented optical assembly having multiple optical elements spliced together, where each optical element has a defined and controlled length.
Figure 6B:
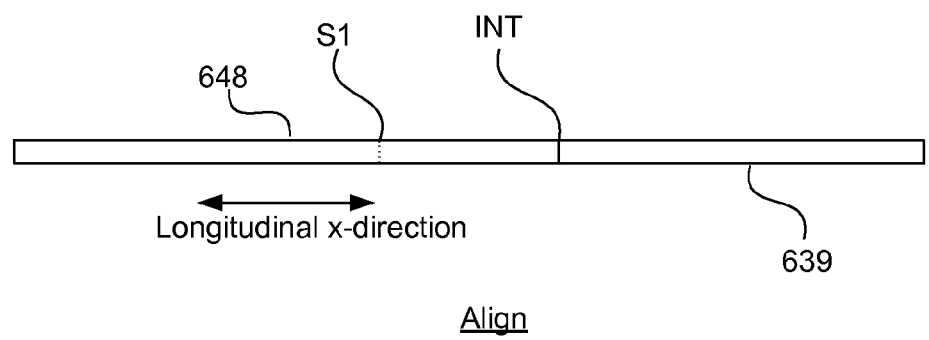

The method of fabrication of a segmented optical assembly can be the same as or similar to the previously described method of forming an optical assembly as described in relation to FIGS. 2A-2F. In this method, an optical subassembly 648 can be joined to an optical element 639, as shown in FIG. 6A. The optical subassembly 648 can include, for example, a first optical element 636 spliced to a second optical element 638 at splice S1, and cleaved at a distance $D_1$ from the splice S1 in a similar manner as described above with reference to FIGS. 2A-2F. In other words, the optical subassembly 648 can be similar to an intermediate optical assembly as described above with reference to FIGS. 2A-2F. In the method of FIGS. 6A-6F, the optical subassembly 648 and the optical element 639 can be joined to form a segmented optical assembly as described below. Both optical subassembly 648 and the optical element 639 can be elongated or extend a length along a longitudinal, x-direction as shown in FIG. 6B. The optical element 639 can be, for example, an optical fiber or some other optical element as previously described.

To form the segmented optical assembly, the optical subassembly 648 can be aligned (as shown in FIG. 6B) with the optical element 639 such that an end face of the optical subassembly 648 abuts an end face of the optical element 639. As described above for previous embodiments, submicron positioning accuracy can be used to align optical subassembly 648 and optical element 639. For example, stepper and/or piezoelectric actuated motors that have submicron or nanometer resolution can be used to translate the optical subassembly 648 and the optical element 639 to provide a sufficient level of alignment control.

Figure 6C:
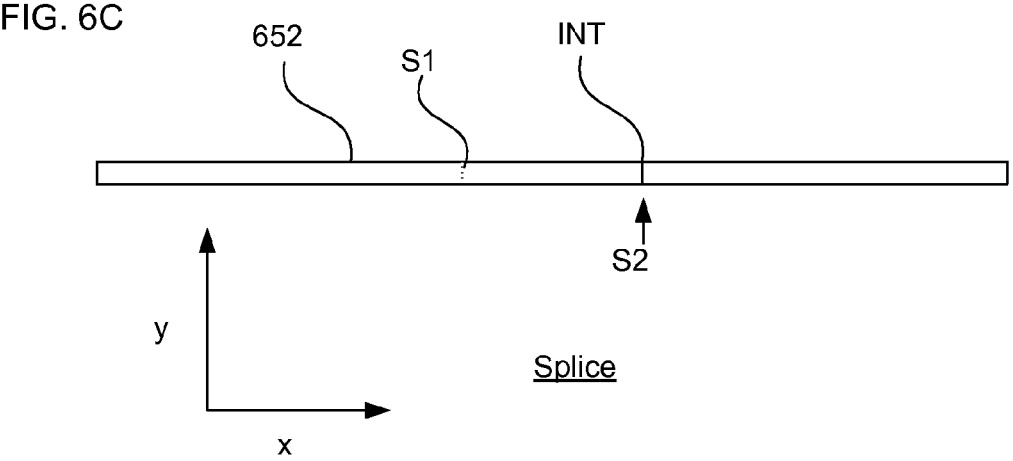

An optical image recognition system (e.g., as described with respect to FIGS. 1 and 4) can be used to facilitate the alignment. A location of an interface INT (see e.g., FIG. 6B) between optical subassembly 648 and optical element 639 can be recorded by the image recognition system and digitally processed such that the interface location INT can be accurately known and recorded as described above for previous embodiments. Heat can be applied at a joint between optical subassembly 648 and optical element 639 to splice optical subassembly 648 and optical element 639 together to form an intermediate optical assembly 652, as shown in FIG. 6C. The splice S2 can be substantially parallel to the y-direction. The splice location can be substantially coincident with the position of the interface INT between optical subassembly 648 and optical element 639 prior to forming the splice. Thus, the splice position can be determined by the optical image recognition system by directly measuring the splice location (e.g., splice S2 location) using an image recognition system and digital signal processing, or inferring the splice location from the location of the interface INT between the abutting optical subassembly 648 and optical element 639, which was determined using image recognition and digital signal processing.

Figure 6D:
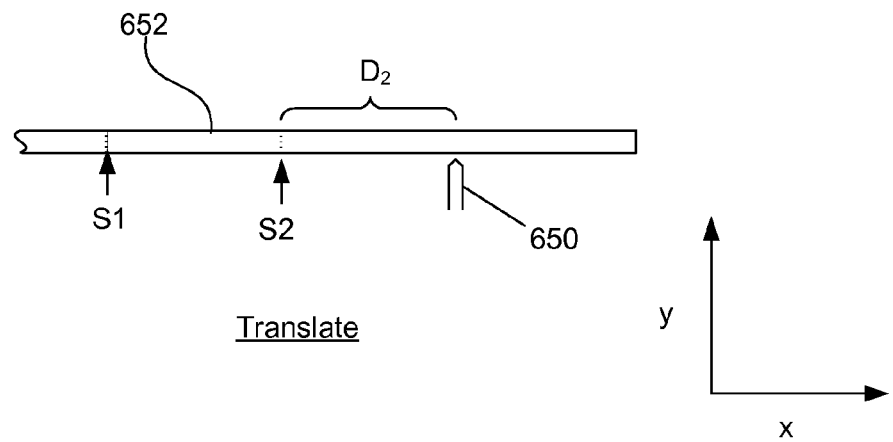

The intermediate optical subassembly 652 can be translated along the longitudinal x-direction, as shown in FIG. 6D. The amount of translation can be such that the distance $D_2$ between a cleave blade and the splice S2 along the longitudinal x-direction can be defined by a user. Stepper and/or piezoelectric actuated motors having sub-micron or nanometer resolution can be used to translate the intermediate optical subassembly 652 as described above for previous embodiments. A stepper motor resolution can be, for example, approximately 0.25 microns. A piezoelectric motor resolution can be, for example, approximately 1 nm. Alternatively, the intermediate optical subassembly 652 can be fixed and the cleave blade can move in the longitudinal x-direction, both the intermediate optical subassembly 652 and the cleave blade can move in the longitudinal x-direction.

Figure 6E:
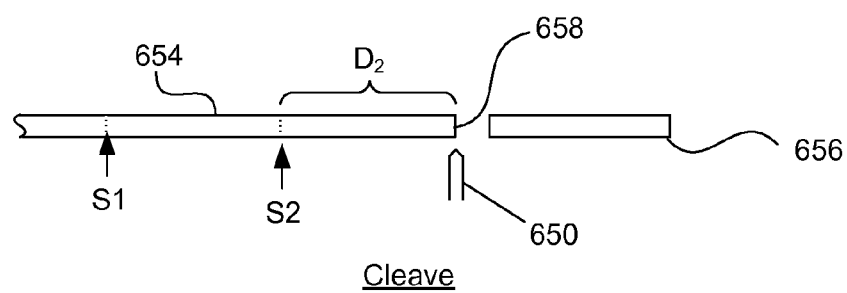
Figure 6F:
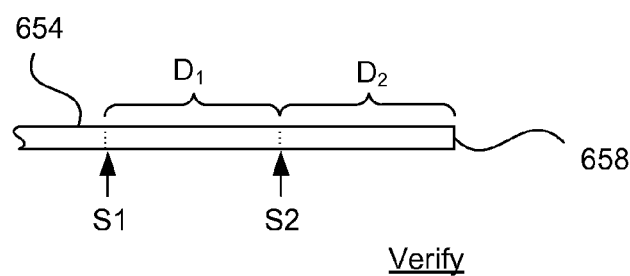

The intermediate optical subassembly 652 can be cleaved to form an optical subassembly 654 and a waste element 656, as shown in FIG. 6E. The cleave blade 650 can form an end face 658 on the end of the optical subassembly 654, and the waste element 656 can be discarded as described above for previous embodiments. Optionally, as shown in FIG. 6F, the distance $D_2$ between the splice S2 and the end face 658 of the optical subassembly 654 can be verified to determine if the distance $D_2$ is within a user-defined tolerance. By sequentially using the fabrication method described with respect to FIGS. 6A-6F, complex segmented optical assemblies can be fabricated.

Figure 7:
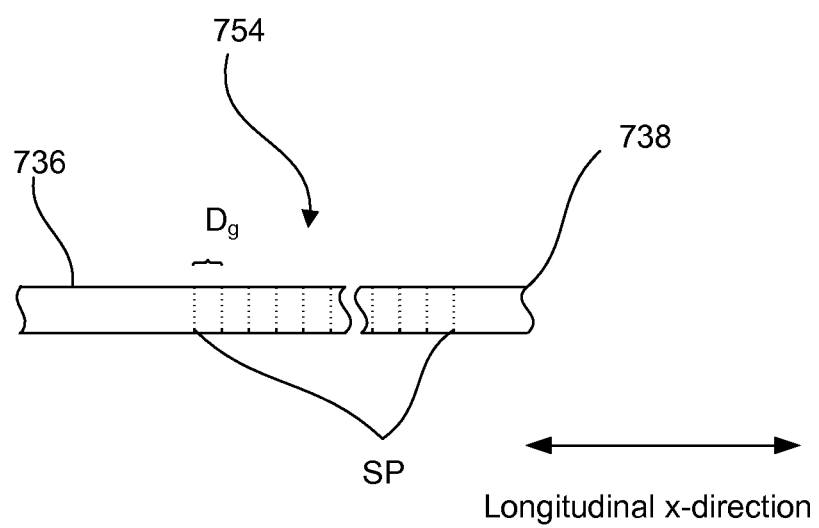
FIG. 7 is an illustration of a portion of a segmented optical assembly, according to an embodiment.

FIG. 7 is a schematic illustration of a portion of a segmented optical assembly, according to another embodiment. The segmented optical assembly 754 has an optical fiber 736 on one end and an optical fiber 738 on an opposite end. Between the optical fibers 736 and 738 there is a region with multiple spliced interfaces between various optical elements arranged sequentially along a longitudinal x-direction. A distance between these splice interfaces $D_g$ can be uniform or can vary. The splice interfaces can help to form optical cavities, periodic structures, gratings or achieve beam shaping.

Figure 8:
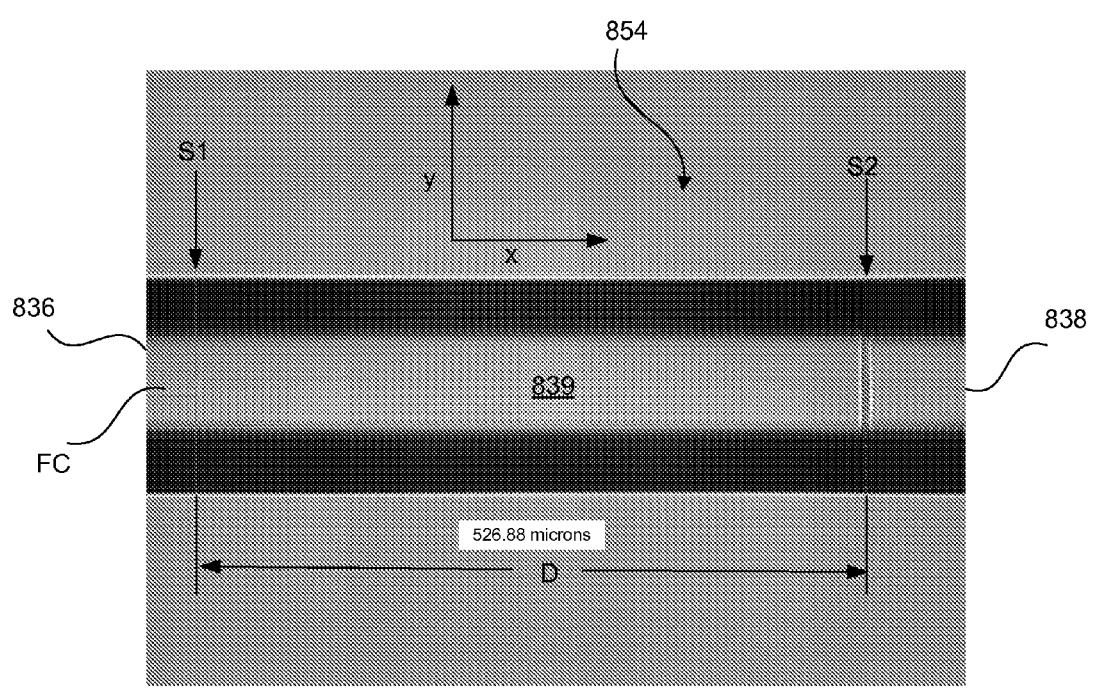
FIG. 8 is an exemplary image of a portion of a segmented optical assembly showing two splice locations.

FIG. 8 is an image showing a portion of a segmented optical assembly 854 (with cladding removed) having two splices, according to another embodiment. The image is another example of an image that can be obtained using, for example, the splice and cleave device 100 or 400. As shown in FIG. 8, a first splice S1 is located at a joint between an optical element 836 and an optical element 839. The optical element 839 is also spliced to an optical element 838 at a second splice S2. Optical element 836 has a visible fiber core FC; optical elements 838 and 839 have no visible core. The first splice S1 is almost invisible in this image, but the previously-described image recognition algorithm/process can detect the location of the splice S1 by the image discontinuity at the end of the fiber core FC. Optical element 839 has a user defined length D extending in the x-direction. In this image, the user-defined length D is 526.88 microns. Fabrication to this user-defined length can be achieved by using the previously-described method of splicing and cleaving.

Figure 9:
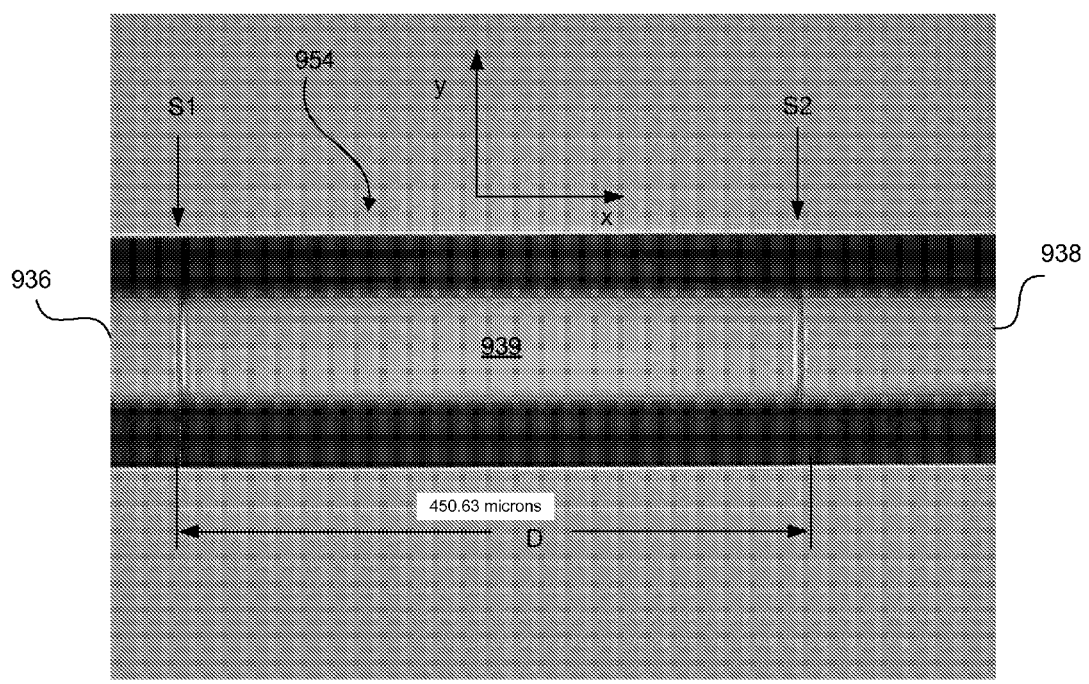
FIG. 9 is another exemplary image of a portion of a segmented optical assembly showing two splice locations.

FIG. 9 is an image of a portion of another segmented optical assembly 954 (with cladding removed) having two splices. A first splice S1 is located at a joint between an optical element 936 and an optical element 939, and a second splice S2 is located at a joint between optical element 939 and an optical element 938. In this embodiment, optical element 939 has a user defined length D extending in the x-direction, which is 450.63 microns.

Figure 10:
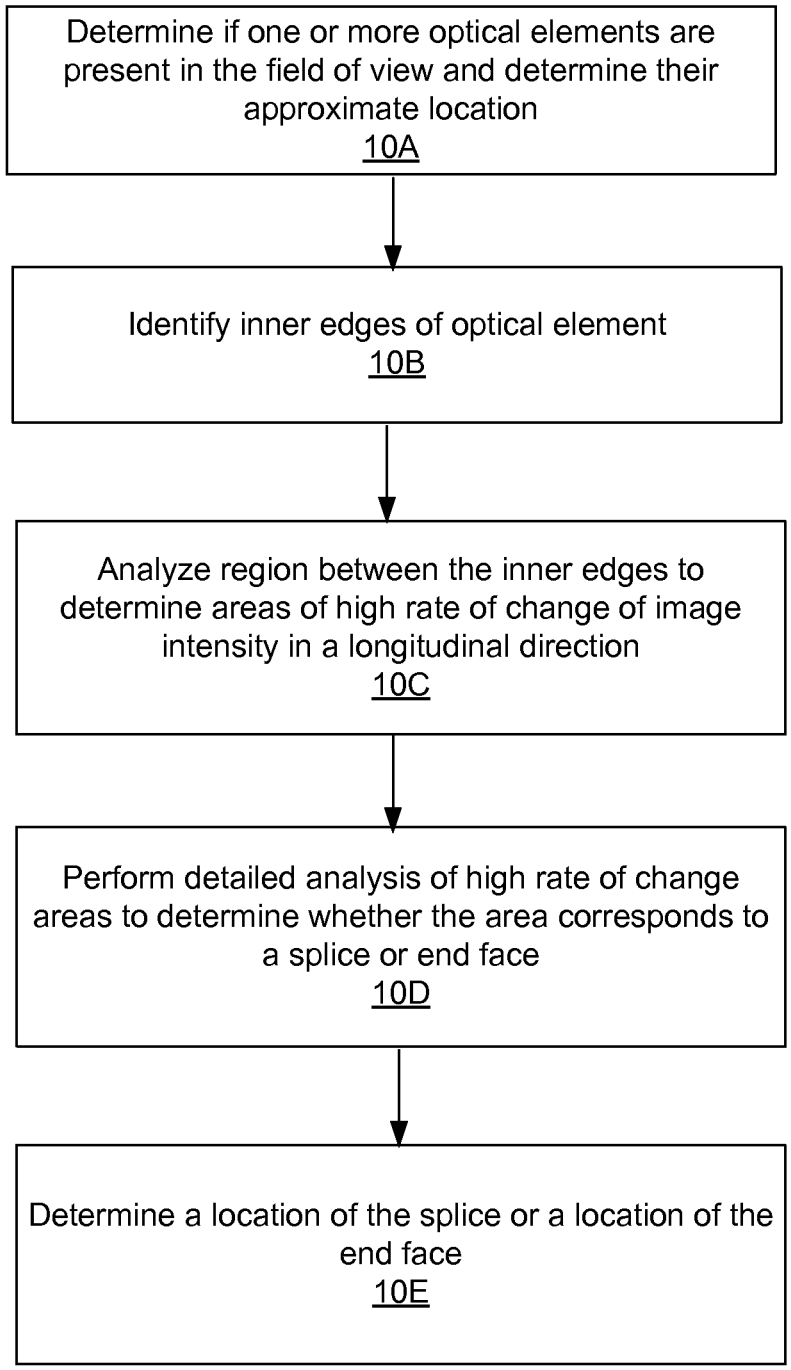
FIG. 10 is a flowchart illustrating steps of an algorithm/process configured to determine the location of a reference feature and/or end face of an optical element, according to an embodiment.

FIG. 10 is a flowchart illustrating the method by the image recognition algorithm/process described above. At 10A, one or more optical elements present in the field of view of an image recognition system as described herein can be detected and their approximate positions can be recorded. At 10B, the inner edges of an optical element(s) in the field of view can be identified. At 10C, the region between the inner edges can be scanned in the longitudinal direction to identify any area having a high rate of change of the image intensity in the longitudinal direction. At 10D, areas having a high rate of change are analyzed in more detail to determine whether they correspond to a reference feature (e.g., a splice, etc.) of the optical element(s) or an end face of the optical element(s). At 10E, the location of the reference feature and/or end face can be determined to a desired accuracy and/or precision.

Figure 11:
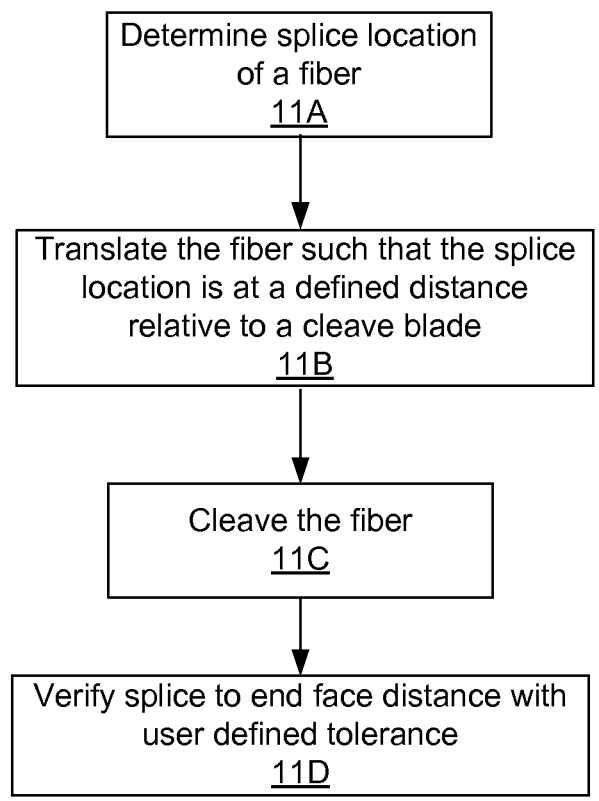
FIG. 11 is flowchart illustrating a method of splicing and cleaving an optical element, according to an embodiment.

FIG. 11 is a flowchart illustrating a method of splicing and cleaving an optical element, according to an embodiment. At 11A, a splice location on an optical element (e.g., an optical fiber) can be determined. At 11B, the optical element can be translated such that the splice location is at a defined distance relative to a cleave blade. At 11C, the optical element can be cleaved. At 11D, a distance between the splice location and an end face of the optical element can be verified to a user-defined tolerance.

In alternative embodiments, the splice and cleave operations described with respect to the splice and cleave devices 100 and 400 can be performed by separate devices. For example, a splicing system, such as, for example, a FAS system manufactured by Vytran LLC of Morganville, N.J. can be used as the splicing device. Such a device can be used to form an intermediate optical assembly containing a splice as described herein. A second device can be used to perform the cleave operation. For example, a high precision cleaver device can include the same or similar elements as described herein for the splice and cleave devices 100 and 400, but with the exception of the splicing unit. Such a device can include an image recognition system that can provide accurate determination of a splice position as described above. A translation unit can allow an intermediate optical assembly to be positioned adjacent a cleave blade at a user defined distance from the cleave blade. The cleave blade can form an end face on the optical assembly in a manner as previously described.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. An apparatus, comprising:
a cleave unit;
an image recognition system configured to determine a feature location on an intermediate optical assembly when the intermediate optical assembly is coupled to the cleave unit; and
a translation unit configured to move the intermediate optical assembly along a longitudinal axis such that the feature location is at a defined location relative to a cleave blade of the cleave unit;
wherein the cleaving unit configured to cleave the intermediate optical assembly at the defined location relative to the feature location; and
wherein the image recognition system is configured to:
identify a first inner edge and a second inner edge of the intermediate optical assembly within an image of a field of view of the image recognition system, the inner edges being along the direction of the translation;
analyze a region between the first inner edge and a second inner edge of the intermediate optical assembly to determine at least one area with a high rate of change of image intensity in a longitudinal direction; and
determine the feature location of the intermediate optical assembly along a length of the intermediate optical assembly when the at least one area substantially corresponds to a splice of the intermediate optical assembly.

2. The apparatus of claim 1, further comprising:
a splicing unit operably coupled to the cleave unit and configured to fuse a first optical element to a second optical element to form the intermediate optical assembly.

3. The apparatus of claim 1, wherein the feature location is a select location of one of a tapered fiber section or a stripped fiber region of the intermediate optical assembly.

4. The apparatus of claim 1, wherein the feature location is at least one of a location of a reference mark on the intermediate optical assembly or a location within a Bragg grating on the intermediate optical assembly.

5. The apparatus of claim 1, wherein the image recognition system is configured to pixilate an image into a plurality of image columns substantially perpendicular to the longitudinal direction and a plurality of image rows substantially parallel to the longitudinal direction and configured to scan the plurality of image columns to determine a greatest rate of change in image intensity for each image column from the plurality of image columns,
the at least one area is determined based at least in part on the scan of the plurality of image columns.

\* \* \* \* \*